US010270090B2

United States Patent
Watanabe et al.

(10) Patent No.: US 10,270,090 B2
(45) Date of Patent: Apr. 23, 2019

(54) PRODUCTION METHOD FOR CATHODE MATERIAL OF LITHIUM SULFUR BATTERY, CATHODE MATERIAL OF LITHIUM SULFUR BATTERY, AND LITHIUM SULFUR BATTERY

(71) Applicant: NATIONAL UNIVERSITY CORPORATION YOKOHAMA NATIONAL UNIVERSITY, Yokohama-shi, Kanagawa (JP)

(72) Inventors: Masayoshi Watanabe, Yokohama (JP); Kaoru Dokko, Yokohama (JP); Zhe Li, Yokohama (JP); Shiguo Zhang, Yokohama (JP)

(73) Assignee: NATIONAL UNIVERSITY CORPORATION YOKOHAMA NATIONAL UNIVERSITY, Kanagawa (JP)

( * ) Notice: Subject to any disclaimer, the term of this patent is extended or adjusted under 35 U.S.C. 154(b) by 111 days.

(21) Appl. No.: 15/522,154

(22) PCT Filed: Oct. 23, 2015

(86) PCT No.: PCT/JP2015/079981
§ 371 (c)(1),
(2) Date: Apr. 26, 2017

(87) PCT Pub. No.: WO2016/068043
PCT Pub. Date: May 6, 2016

(65) Prior Publication Data
US 2017/0317343 A1 Nov. 2, 2017

(30) Foreign Application Priority Data
Oct. 27, 2014 (JP) .................................. 2014-218504

(51) Int. Cl.
| H01M 4/36 | (2006.01) |
| C01B 17/26 | (2006.01) |
| H01M 4/136 | (2010.01) |
| H01M 10/052 | (2010.01) |
| H01M 4/38 | (2006.01) |

(Continued)

(52) U.S. Cl.
CPC ............. *H01M 4/366* (2013.01); *C01B 17/26* (2013.01); *H01M 4/0471* (2013.01);
(Continued)

(58) Field of Classification Search
CPC .......... H01M 4/00–4/02; H01M 4/04–4/0497; H01M 4/13–4/98; H01M 2004/021–2004/026
(Continued)

(56) References Cited

U.S. PATENT DOCUMENTS

2013/0171355 A1 7/2013 Wang et al.
2013/0295464 A1 11/2013 Yanagi et al.
(Continued)

FOREIGN PATENT DOCUMENTS

| EP | 2669974 A1 | 12/2013 |
| JP | 2013229227 A | 11/2013 |

(Continued)

OTHER PUBLICATIONS

JP2013229227 English Translation (Year: 2013).*
(Continued)

*Primary Examiner* — Bach T Dinh
(74) *Attorney, Agent, or Firm* — Holtz, Holtz & Volek PC

(57) ABSTRACT

A production method for a cathode material of a lithium sulfur battery includes, in sequence: a step of preparing a first dispersed solution in which a carbon particle is dispersed in a lithium sulfate solution; a step of adding a solvent in the first dispersed solution, the solvent being a solvent in which lithium sulfate is insoluble; a step of separating a precursor particle from the first dispersed (Continued)

solution in which the solvent is added; and a step of changing the precursor particle into a cathode active material particle by heating the precursor particle under an inert atmosphere.

5 Claims, 13 Drawing Sheets

(51) Int. Cl.
  *H01M 4/58* (2010.01)
  *H01M 4/587* (2010.01)
  *H01M 4/62* (2006.01)
  *H01M 4/04* (2006.01)
  *H01M 4/02* (2006.01)

(52) U.S. Cl.
  CPC .......... *H01M 4/136* (2013.01); *H01M 4/382* (2013.01); *H01M 4/587* (2013.01); *H01M 4/5815* (2013.01); *H01M 4/625* (2013.01); *H01M 10/052* (2013.01); *H01M 2004/021* (2013.01); *H01M 2004/028* (2013.01)

(58) Field of Classification Search
  USPC .......................................... 429/1–11, 65–255
  See application file for complete search history.

(56) References Cited

U.S. PATENT DOCUMENTS

| 2017/0054149 A1 | 2/2017 | Wang et al. |
| 2018/0062161 A1 | 3/2018 | Yanagi et al. |

FOREIGN PATENT DOCUMENTS

| JP | 2014112526 A | 6/2014 |
| KR | 1020140003514 | 1/2014 |
| WO | 2012102037 A1 | 8/2012 |

OTHER PUBLICATIONS

Korean Office Action dated Jun. 21, 2018 issued in corresponding Korean Application No. 10-2017-7010983.
Extended European Search Report (EESR) dated Apr. 3, 2018 issued in counterpart European Application No. 15855521.9.
Zhe Li, et al., "One-pot pyrolysis of lithium sulfate and graphene nanoplatelet aggregates: in situ formed Li2S/graphene composite for lithium-sulfur batteries," NANOSCALE, Jul. 31, 2015, vol. 7, No. 34, pp. 14385-14392.
International Search Report (ISR) and Written Opinion dated Feb. 2, 2016 issued in International Application No. PCT/JP2015/079981.
Feixiang Wu et al., "Solution-Based Processing of Graphene-Li2S Composite Cathodes for Lithium-Ion and Lithium-Sulfur Batteries," Particle & Particle Systems Characterization, Jun. 2014, vol. 31, Issue 6, pp. 639-644.
Zichao Yang et al., "In situ synthesis of lithium sulfide-carbon composites as cathode materials for rechargeable lithium batteries," Journal of Materials Chemistry A, Jan. 28, 2013, vol. 1, No. 4, pp. 1433-1440.
Jusef Hassoun et al., "Rechargeable lithium sulfide electrode for a polymer tin/sulfur lithium-ion battery," Journal of Power Sources, 2011, vol. 196, Issue 1, pp. 343-348.

* cited by examiner

PRODUCTION METHOD FOR CATHODE MATERIAL OF LITHIUM SULFUR BATTERY, CATHODE MATERIAL OF LITHIUM SULFUR BATTERY, AND LITHIUM SULFUR BATTERY

TECHNICAL FIELD

The present invention relates to a production method for a cathode material of a lithium sulfur battery that is composed of a (lithium sulfide/carbon) composite, a cathode material of a lithium sulfur battery that is produced by the production method, and a lithium sulfur battery including the cathode material.

BACKGROUND ART

A theoretical capacity of a lithium sulfur secondary battery including sulfur as a cathode material, which is 1672 mAh/g, is very high, and is ten times a theoretical capacity of a lithium secondary battery including $LiCoO_2$ or the like as a prevailing cathode active material, which is 137 mAh/g. Further, sulfur is low in cost and is abundant as a resource.

Japanese Patent Application Laid-Open Publication No. 2013-229227 discloses a method of reducing lithium sulfate by heating a mixture of lithium sulfate particles and carbon particles at 830° C. and producing a cathode material composed of carbon particles and lithium sulfide particles.

However, it is not easy to perform the heating at a high temperature while fine particles containing lithium sulfate and carbon fine particles are uniformly mixed.

CITATION LIST

Patent Literature

Patent Literature 1: Japanese Patent Application Laid-Open Publication No. 2013-229227

SUMMARY OF INVENTION

Technical Problem

An embodiment of the present invention has an object to provide an easy production method for a cathode material of a high-performance lithium sulfur battery, a cathode material produced by the production method, and a lithium sulfur battery including the cathode material.

Solution to Problem

A production method for a cathode material of a lithium sulfur battery in an embodiment includes, in sequence: a step of preparing a first dispersed solution in which a carbon particle is dispersed in a lithium sulfate solution; a step of adding a solvent in the first dispersed solution, the solvent being a solvent in which lithium sulfate is insoluble; a step of separating a precursor particle from the first dispersed solution in which the solvent is added; and a step of changing the precursor particle into an active material particle by heating the precursor particle under an inert atmosphere.

A cathode material of a lithium sulfur battery in another embodiment is produced by a production method including, in sequence: a step of preparing a first dispersed solution in which a carbon particle is dispersed in a lithium sulfate solution; a step of adding a solvent in the first dispersed solution, the solvent being a solvent in which lithium sulfate is insoluble; a step of separating a precursor particle from the first dispersed solution in which the solvent is added; and a step of changing the precursor particle into a cathode active material particle by heating the precursor particle under an inert atmosphere.

Further, a lithium sulfur battery in another embodiment includes a cathode material produced by a production method including, in sequence: a step of preparing a first dispersed solution in which a carbon particle is dispersed in a lithium sulfate solution; a step of adding a solvent in the first dispersed solution, the solvent being a solvent in which lithium sulfate is insoluble; a step of separating a precursor particle from the first dispersed solution in which the solvent is added; and a step of changing the precursor particle into a cathode active material particle by heating the precursor particle under an inert atmosphere.

Further, a cathode material of a lithium sulfur battery in another embodiment includes a (lithium sulfide/carbon) composite including a carbon particle, the carbon particle having lithium sulfide formed on an outer surface.

Further, a lithium sulfur battery in another embodiment includes a cathode material including a (lithium sulfide/carbon) composite including a carbon particle, the carbon particle having lithium sulfide formed on an outer surface.

Advantageous Effects of the Invention

According to an embodiment of the present invention, it is possible to provide an easy production method for a cathode material of a high-performance lithium sulfur battery, a cathode material of a high-performance lithium sulfur battery, and a lithium sulfur battery including a high-performance cathode material.

BEST MODE FOR CARRYING OUT THE INVENTION

<First Embodiment>

Figure 1:
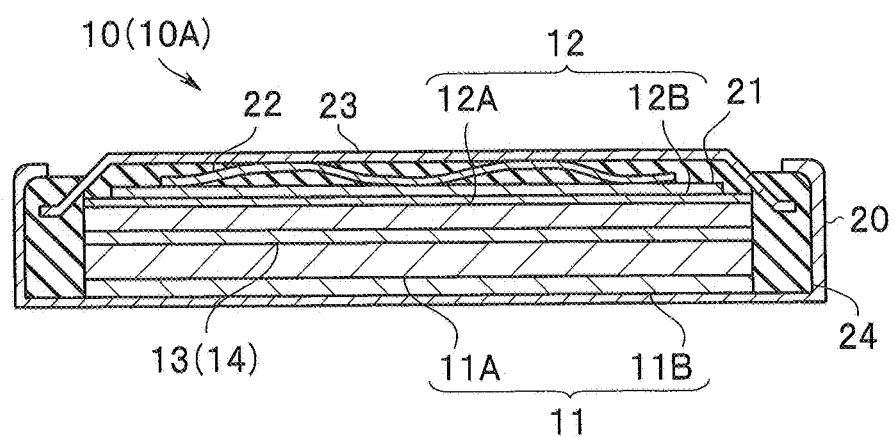
FIG. 1 is a cross-section view showing a configuration of a battery in an embodiment.

As shown in FIG. 1, a lithium sulfur battery (hereinafter, referred to as a "battery") 10 in the present embodiment includes a cathode 11, an anode 12, a separator 13 and an electrolyte 14. The cathode (positive electrode) 11 includes a cathode active material layer 11A containing a (lithium sulfide/carbon) composite, and a current collector 11B. The anode (negative electrode) 12 includes a metal lithium.

In the battery 10, which is CR2032 coin type, the cathode 11 and the anode 12 are laminated with the separator 13 impregnated with the electrolyte 14, and are encapsulated in a coin cell case 20. That is, a spacer 21 and a spring 22 are provided on the anode 12, and the coin cell case 20 is sealed with a cap 23. Note that a gasket 24 is interposed on a sidewall of the coin cell case 20.

An anode active material layer 12A of the anode 12 is charged/discharged as shown in a following (Formula 1).

$$Li^+ + e^- \leftarrow(discharge)\leftarrow\rightarrow(charge)\rightarrow Li \quad \text{(Formula 1)}$$

On the other hand, the cathode active material layer 11A of the cathode 11 includes sulfur as a cathode active material that can occlude and release lithium ion, as shown in a following (Formula 2).

$$S_8 + 16Li^+ + 16e^- \leftarrow(charge)\leftarrow\rightarrow(discharge)\rightarrow 8Li_2S \quad \text{(Formula 2)}$$

In the battery 10, which is a charge-start type, that is, in which an initial state is a discharged state, the anode 12 contains a metal lithium as an anode active material, and the cathode 11 contains lithium sulfide as a cathode active material.

For the electrolyte 14, various solvents that are used also in conventional lithium ion batteries are used. Especially, an aprotic solvate ionic liquid in which an ether and a lithium salt forms a complex is particularly suitably used because of having a refractory property, a low viscosity, a high lithium ion concentration and a high lithium ion conductive property. Further, an electrolyte in which the aprotic solvate ionic liquid is diluted by the addition of a solvent can be also used. As the added solvent, a solvent that does not break the structure of the complex formed by the ether and the lithium salt is suitably used. Examples of the added solvent include a hydrofluoroether (HFE) such as $HF_2CF_2CH_2C$—O—$CF_2CF_2H$ and $F_3CH_2C$—O—$CF_2CF_2H$, which are fluorine solvents.

Examples of the separator 13 disposed between the cathode 11 and the anode 12 include a porous sheet and a non-woven fabric that are composed of a glass fiber or a polymer.

In the battery 10, which is a charge-start type, the cathode 11 (cathode active material), particularly, includes a (lithium sulfide/carbon) composite ($Li_2S$ on carbon) 44 in which lithium sulfide is formed on an outer surface of a carbon particle. As described later in detail, a precursor particle 41 that is a carbon particle 40 (FIG. 3B) having lithium sulfate 42 deposited on the outer surface is prepared from a first dispersed solution 30 (FIG. 3A) in which the carbon particle 40 is dispersed in a lithium sulfate solution. Then, the precursor particle 41 is heated at a high temperature under an inert atmosphere, and thereby, the (lithium sulfide 43/carbon 40A) composite (active material particle) 44 (FIG. 3C) is produced.

Although lithium sulfide has a low conductivity, the battery 10 has a good charge-discharge characteristic and provides a high-performance, because lithium sulfide is combined with the carbon particle having a high conductivity in the cathode 11 of the battery 10.

Figure 3A:
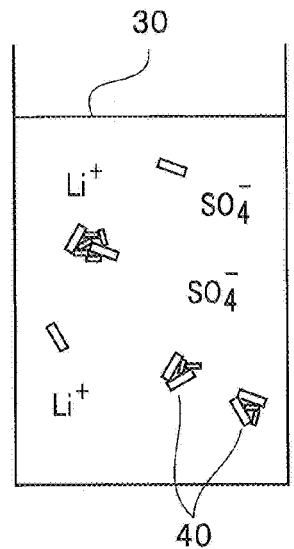
FIG. 3A is a schematic view for describing the production method for the cathode material of the battery in the embodiment.
Figure 3B:
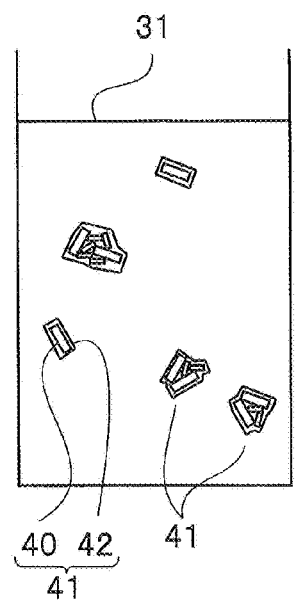
FIG. 3B is a schematic view for describing the production method for the cathode material of the battery in the embodiment.
Figure 3C:
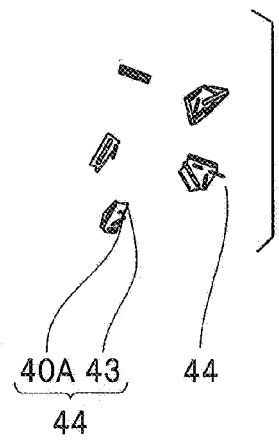
FIG. 3C is a schematic view for describing the production method for the cathode material of the battery in the embodiment.

Note that the carbon particle may have a spherical shape, an amorphous shape or the like although FIG. 3A to FIG. 3C schematically illustrate carbon particles 40, 40A as a flat body and an aggregate of flat bodies. Note that the lithium sulfide 43 may have a through-hole or a crack or may be divided into a plurality of small pieces because the (lithium sulfide 43/carbon 40A) composite 44 (FIG. 3C) releases carbon dioxide at the time of a reduction reaction as described later.

The carbon 40A of the (lithium sulfide/carbon) composite 44 has lithium sulfide formed on the outer surface. Here, the "formation" means that the lithium sulfate deposited on the outer surface is changed into the lithium sulfide by the reduction reaction, and for example, shows a different configuration from the configuration described in Japanese Patent Application Laid-Open Publication No. 2013-229227, in which a mere physical fixation is performed.

<Production Method>

Figure 2:
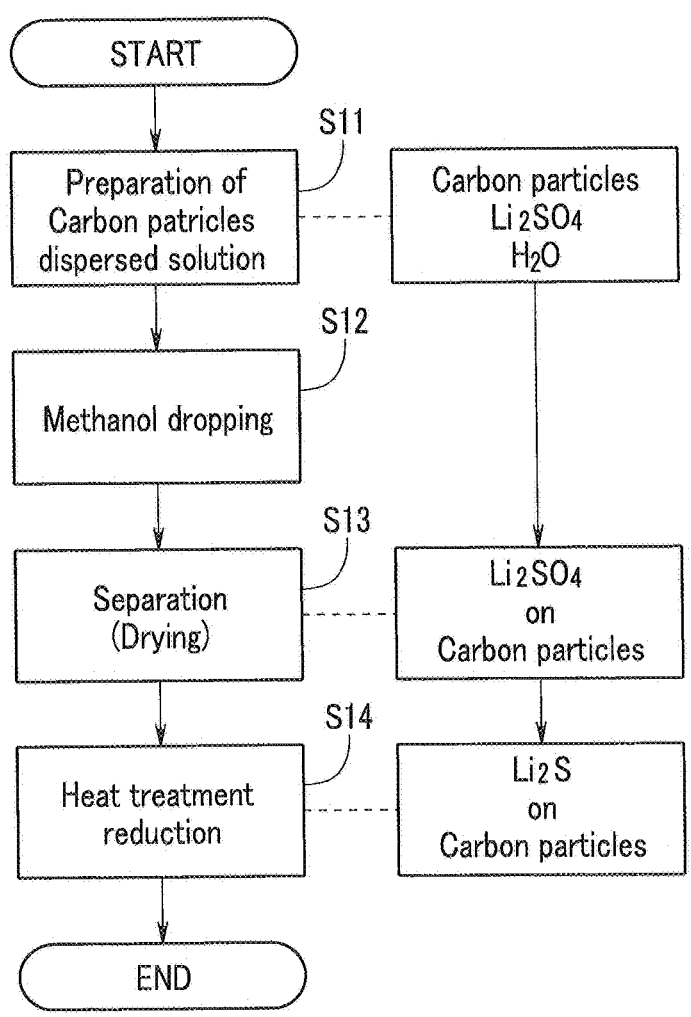
FIG. 2 is a flowchart of a production method for a cathode material of the battery in the embodiment.

Next, a production method for the cathode material of the battery 10, which is a lithium sulfur type secondary battery, will be described along a flowchart shown in FIG. 2.

<Step S11> Dispersed Solution Preparation

As shown in FIG. 3A, a first dispersed solution 30 in which carbon particles 40 are dispersed in a lithium sulfate solution is prepared.

The lithium sulfate solution, that is, the solution containing lithium ion and sulfate ion is prepared by dissolving solid lithium sulfate monohydrate in a first solvent. As the first solvent, it is preferable to use water that has a high solubility for lithium sulfate monohydrate and that is inexpensive and safe.

For example, 1.6 g of lithium sulfate monohydrate is dissolved in 70 mL of water, so that the lithium sulfate aqueous solution 30 is prepared.

The carbon particle 40 is not particularly limited. Examples of the carbon particle 40 include graphene-laminated nanoplate in which graphenes are laminated (hereinafter, referred to as "GNP"), porous carbon material, acetylene black, inverse oval carbon, carbon nanofiber, carbon nanotube, carbon black and graphite. Among the carbon particles, one kind may be used, or two or more kinds may be used. A secondary particle forming an aggregate may be used. Especially, as shown in FIG. 4A and FIG. 4B, graphene-laminated nanoplates (hereinafter, referred to as "GNAs") in which GNPs (Strem Chemicals Inc., CAS No.

1034343-98-0) aggregate to form secondary particles are preferable, because of an easy handling and a relatively low price.

The GNP is a roughly rectangular flat body in which several tens to several hundreds of graphene layers are laminated, and a maximum thickness is, for example, about several micrometers. Since the GNP is a minute particle, a specific surface area is 750 m²/g. In the case of a GNP having a specific surface area of 200 m²/g or greater, a graphene lamination number is small, and the conductivity is particularly high. Note that an upper limit of the specific surface area is, for example, about 3000 m²/g in view of cost and technique.

Figure 4A:
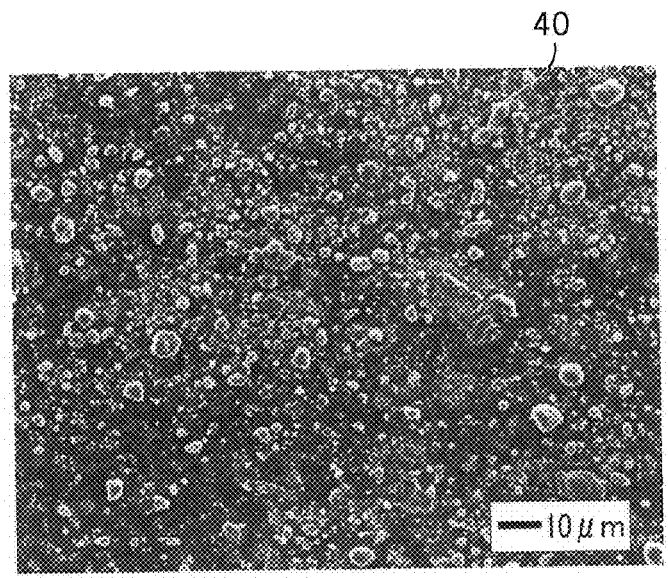
FIG. 4A is a SEM micrograph of carbon particles of the battery in the embodiment.
Figure 4B:
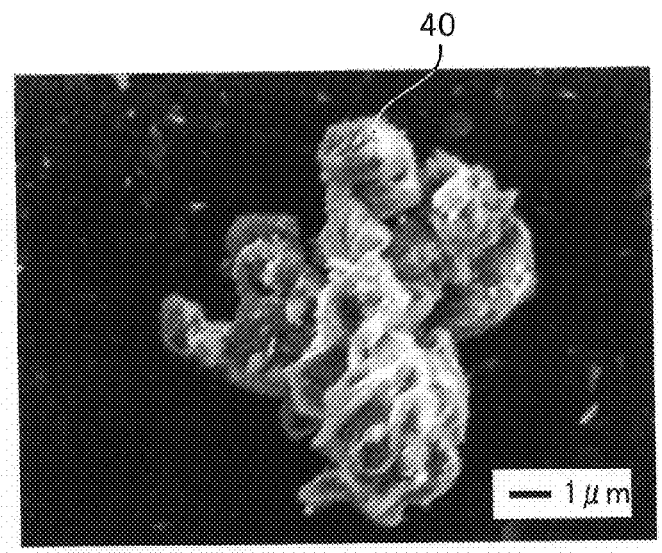
FIG. 4B is a SEM micrograph of a carbon particle of the battery in the embodiment.

Note that a particle diameter (secondary particle diameter) is 0.3 μm to 7 μm in the GNAs shown in FIG. 4A and FIG. 4B.

In the lithium sulfate aqueous solution of (1.6 g of lithium sulfate monohydrate/70 mL of water), 0.48 g of carbon particles 40 (GNAs) is added. An ultrasound stirring is performed for 2 hours, and thereafter, a mechanical stirring is further performed for 4 hours, so that the first dispersed solution 30 in which the carbon particles 40 are dispersed in the lithium sulfate solution is prepared.

Note that the carbon particles 40 and the lithium sulfate may be added in water at roughly the same time, or the lithium sulfate may be added in a carbon particle dispersed water and then may be dissolved, in the preparation of the first dispersed solution 30.

<Step S12> Methanol Dropping

A second solvent that is a precipitating agent in which lithium sulfate is insoluble is added in the first dispersed solution 30. Thereby, as shown in FIG. 3B, the lithium sulfate 42 is deposited on outer surfaces of the carbon particles 40. In other words, the first dispersed solution 30 is changed into a second dispersed solution 31 in which (lithium sulfate/carbon) composites 41 that are precursor particles composed of the carbon particles 40 having the lithium sulfate 42 formed on the outer surfaces are dispersed in water.

Examples of the second solvent include methanol, ethanol, propyl alcohol, isopropyl alcohol, acetone, acetonitrile and diethyl ether, in which lithium sulfate is hardly soluble. Among the second solvents, one kind may be used, or two or more kinds may be used. Especially, alcohols such as ethanol and methanol are preferable, and ethanol is particularly preferable from the standpoint of safety and price.

For example, with the mechanical stirring of the first dispersed solution 30 in which 0.48 g of carbon particles 40 (GNAs) is dispersed in the lithium sulfate aqueous solution of (1.6 g of lithium sulfate monohydrate/70 mL of water), 800 mL of ethanol is dropped at a rate of 200 drops per minute. Note that one drop of ethanol is about 0.05 mL.

By the addition of ethanol that is a precipitating agent, the lithium sulfate (lithium ion/sulfate ion) dissolved in water is deposited (crystallized) while the carbon particles 40 are nucleated. That is, as shown in FIG. 3B, the (lithium sulfate/carbon) composites 41 ($Li_2SO_4$ on carbon), which are the carbon particles 40 having the lithium sulfate monohydrates 42 deposited on the outer surfaces, are prepared. Note that an aggregate in which a circumference of a secondary particle composed of a plurality of carbon particles is covered with lithium sulfate is sometimes formed because lithium sulfate is deposited on an outer surface of a plurality of carbon particles that are aggregated or lithium sulfate is thickly deposited on surfaces of dispersed carbon particles and is bonded (FIG. 5).

Figure 5:
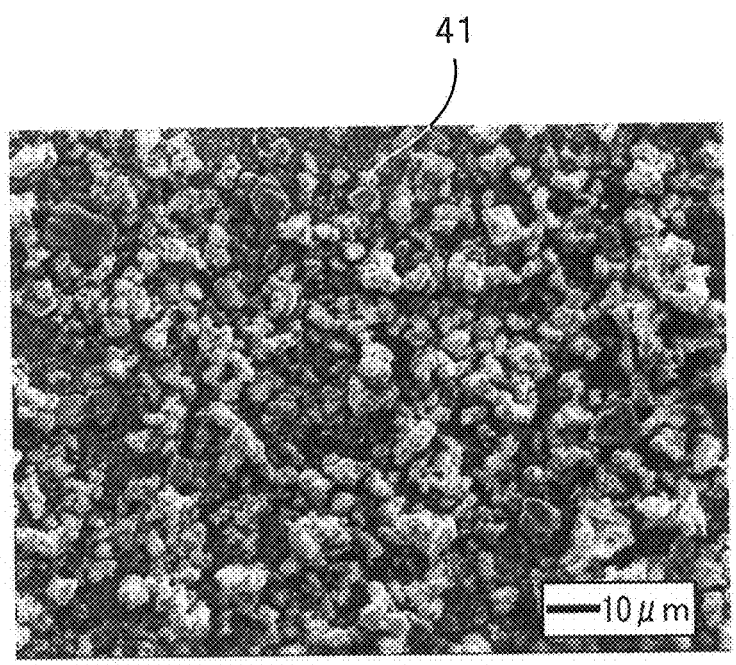
FIG. 5 is a SEM micrograph of precursor particles of the battery in the embodiment.

As shown in FIG. 5, the GNAs (carbon particles 40) shown in FIG. 4A, FIG. 4B, which have a particle diameter of 0.3 μm to 7 μm, became the (lithium sulfate/carbon) composites (precursor particles) 41 having a particle diameter of 1.0 μm to 10.0 μm (average particle diameter d50=6.5 μm), by the increase in the particle diameter due to the deposition reaction of lithium sulfate. Note that the particle diameter was measured from a scanning electron microscope (SEM) micrograph. The average particle diameter d50 is an arithmetic mean value of the particle diameters of 30 particles.

Figure 6A:
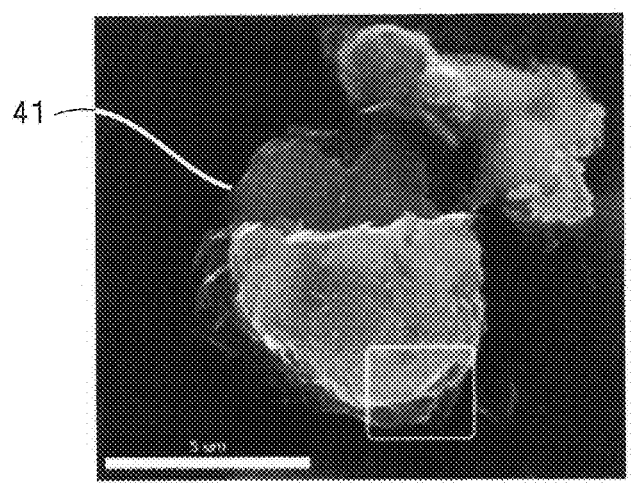
FIG. 6A is a SEM micrograph of a precursor particle of the battery in the embodiment.
Figure 6B:
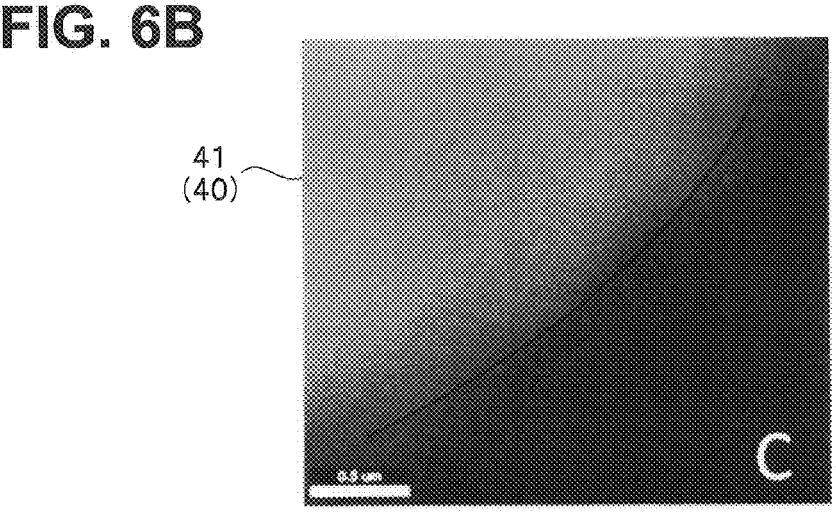
FIG. 6B is a diagram showing a carbon distribution of the precursor particle within a box in FIG. 6A.
Figure 6C:
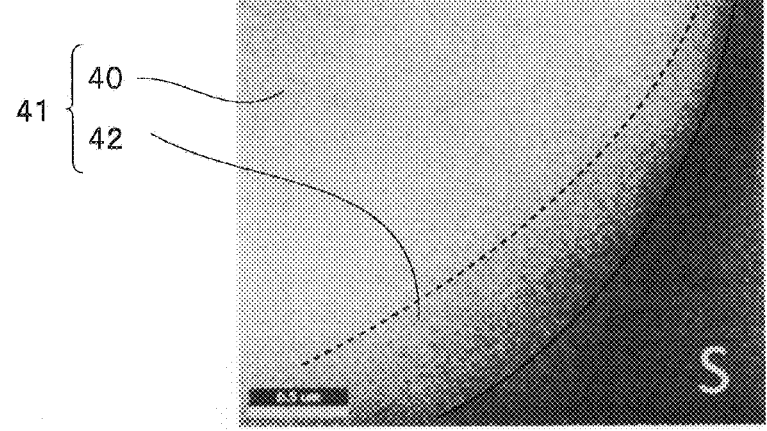
FIG. 6C is a diagram showing a sulfur distribution of the precursor particle within the box in FIG. 6A.

FIG. 6B and FIG. 6C show an EDX analysis (energy dispersive X-ray spectroscopy) indicating a carbon distribution (FIG. 6B) or a sulfur distribution (FIG. 6C) of the (lithium sulfate/carbon) composite 41 within a box shown in FIG. 6A. From FIG. 6B and FIG. 6C, it is found that sulfur is uniformly distributed around carbon and lithium sulfate is deposited while the carbon particles 40 are nucleated.

<Step S13> Separation (Drying)

The second dispersed solution 31 is filtered and is washed with ethanol, and a vacuum drying (40° C.) is performed for 12 hours. Thereby, the precursor particles 41, which are black powders ($Li_2SO_4$-GNAs Mix) composed of the carbon particles having lithium sulfate deposited on the outer surface, is obtained. Note that the precursor particles 41 may be separated by the increase in the temperature of the dispersed solution and the evaporation of the solvent, without the filtration.

<Step S14> Heat Treatment Reduction

The precursor particles 41 (FIG. 3B, FIG. 5) are heated at about 800° C. under an inert atmosphere, and thereby, the (lithium sulfide/carbon) composites (FIG. 3C, FIG. 7A, FIG. 7B), which are active material particles 44, are prepared.

That is, lithium sulfate is reduced by carbon so as to become lithium sulfide, as shown in a following (Formula 3).

$$Li_2SO_4 + 2C \rightarrow Li_2S + 2CO_2 \qquad \text{(Formula 3)}$$

The inert atmosphere, for example, is an atmosphere of an inert gas such as argon and nitrogen, or a vacuum atmosphere.

By a measurement using a thermogravimetry-mass simultaneous analysis apparatus (TG-MS), which is not illustrated, it was confirmed that absorbed water and lithium sulfate crystal water were desorbed at 84° C. to 134° C. and $CO_2$ was generated at 781° C. by the reaction of (Formula 3), in the (lithium sulfate/carbon) composite 41. That is, the heating for the reduction reaction may be performed at a temperature of 750° C. or higher and 850° C. or lower, under the inert atmosphere. In the case of 750° C. or higher, the reduction reaction proceeds sufficiently in a short time period, and in the case of 850° C. or lower, an undesirable side reaction such as oxidation reaction is unlikely to occur.

Based on the result of the TG-MS, a heat treatment of the (lithium sulfate/carbon) composites 41 was performed while argon flowed through a tube furnace. Temperature rise conditions are shown by following (A) to (F).

(A) 30° C., 1 hour, (B) temperature rise to 200° C. at 10° C./minute, (C) 200° C., 1 hours, (D) temperature rise to 781° C. at 10° C./minute, (E) 781° C., 2 hours, (F) natural cooling The carbon particles 40 of the (lithium sulfate/carbon) composites 41 are consumed by the reduction reaction shown in (Formula 3), and therefore, become small. Remaining carbon particles 40A have a function as an electron conductive carrier for lithium sulfide.

Figure 7A:
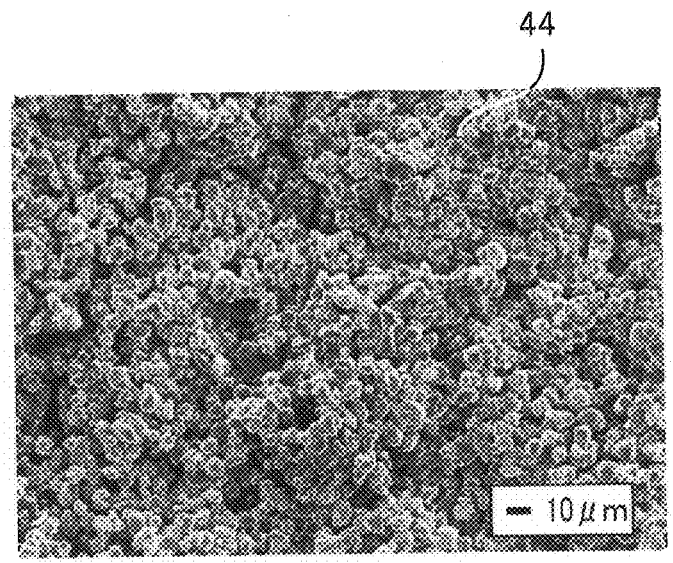
FIG. 7A is a SEM micrograph of active material particles of the battery in the embodiment.
Figure 7B:
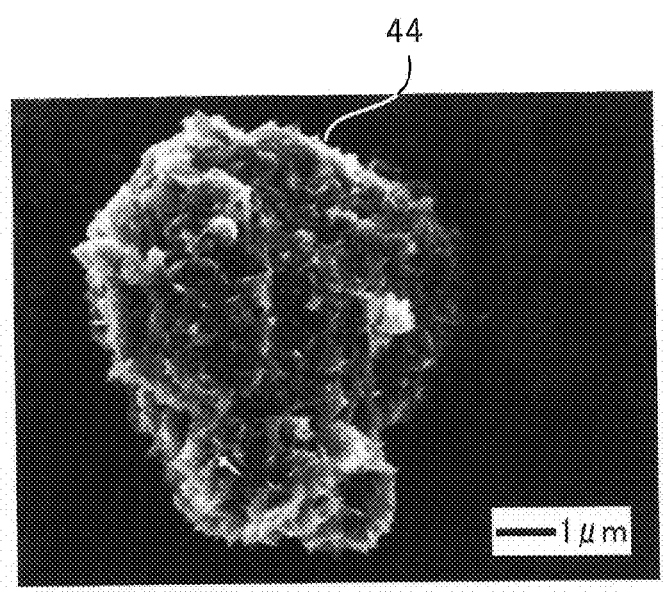
FIG. 7B is a SEM micrograph of an active material particle of the battery in the embodiment.

Here, as shown in FIG. 7A and FIG. 7B, in the (lithium sulfide/carbon) composites 44 having a particle diameter of 1 μm to 10 μm (average particle diameter d50=6.5 μm), the flat GNP sometimes protrudes from a part of the outer surface. This is probably because the aggregate (precursor particle 41) having the outer surface covered with lithium sulfate is crushed by the carbon dioxide generated in the reduction reaction. That is, unlike the carbon particle 40 of the (lithium sulfate/carbon) composite (precursor particles) 41, in the (lithium sulfide/carbon) composites (active material particles) 44, a part of the outer surface of the carbon particle 40A is sometimes not covered with lithium sulfide.

In other words, in the cathode material of the lithium sulfur battery in the embodiment, a part of the carbon particle 40A is sometimes exposed on the outer surface of the active material particle 44.

Lithium sulfide is dissolved in methanol. Therefore, by washing the (lithium sulfide/carbon) composites 44 with methanol, it is possible to observe remaining carbon particles 40A that have not been consumed in the reduction reaction.

Figure 8:
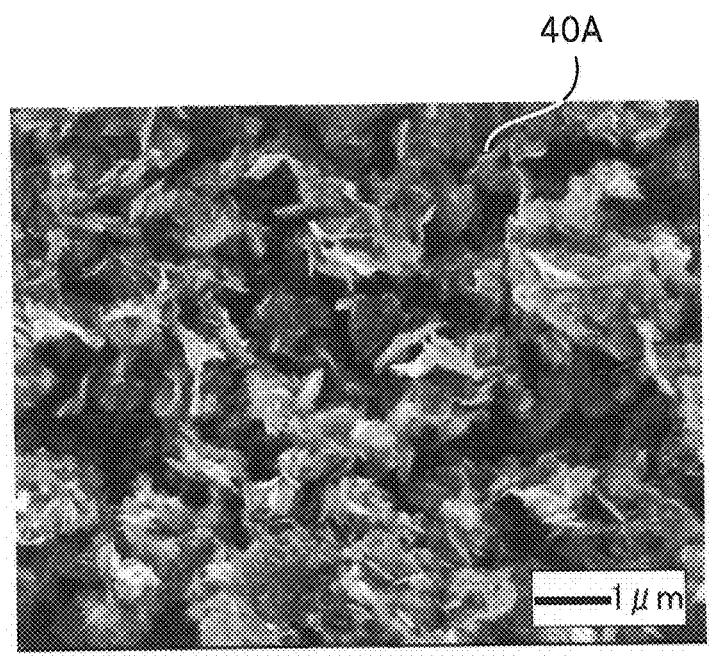
FIG. 8 is a SEM micrograph of carbon of the active material particle of the battery in the embodiment.

As shown in FIG. 8, in the embodiment using GNAs as the carbon particles, the thickness of the GNP configuring the GNAs becomes smaller.

Further, in a measurement with an atomic force microscope (AFM), the thickness of a certain GNP before the reduction reaction was 90 nm, and the thickness of another GNP after the reduction reaction was 1.0 nm to 1.3 nm.

Note that weight measurements before and after the washing with methanol revealed that 78 wt % of the (lithium sulfide/carbon) composite 44 was lithium sulfide and 22 wt % was GNAs.

<Evaluation>

Next, the battery 10 was made using the cathode material composed of the (lithium sulfide/carbon) composite 44, and charge-discharge characteristic was evaluated.

In the evaluation, a metal lithium was used in the anode 40. That is, the anode 40 was made by attaching a lithium metal plate having a thickness of 200 μm to a stainless-steel disc having a thickness of 500 μm.

For preparing the cathode active material, 13 wt % carbon black (Super-P), which was a conducting agent, and 10 wt % polyvinyl pyrrolidone (PVP), which was a binding agent having a high affinity for lithium sulfide, were mixed with 77 wt % (lithium sulfide/carbon) composite (active material particle).

Since 78.3 wt % of the (lithium sulfide/carbon) composite 44 is lithium sulfide as described already, 77 wt % (lithium sulfide/carbon) composite in the above mixture is composed of 60 wt % lithium sulfide and 17 wt % GNAs. Then, the carbon component in the above mixture is composed of 13 wt % carbon black and 17 wt % GNAs, and is 30 wt % in total.

The cathode 11 was made, by applying a slurry resulting from adding and kneading a moderate amount of NMP (N-methyl-2-pyrrolidone), on the current collector 11B formed of an aluminum foil, and performing drying/pressing, after the heat treatment of the above mixture.

Note that a foil, a mesh, an expanded grid (expanded metal), a punched metal and the like on which a conductive metal such as aluminum, nickel, copper and stainless steel is formed can be used as the current collectors 11B, 12B. Further, a resin having a conductive property or a resin containing a conductive filler may be used as the current collectors. The thickness of the current collector is, for example, 5 to 30 μm.

The separator 13 was a glass filter (Toyo Roshi Kaisha, Ltd.: GA-55) having a thickness of 200 μm. For the electrolyte 14, an aprotic solvate ionic liquid in which an ether and a lithium metal salt formed a complex was diluted with a solvent. As the ether, tetraglyme (G4: tetraethylene glycol dimethyl ether) was used. As the lithium metal salt, lithium bis(trifluoromethanesulfonyl)amide (LiTFSA) was used. As the solvent, hydrofluoroether (HFE), molar quantity of which was 4 times the molar quantity of lithium, was used. That is, the electrolyte 14 is shown by a chemical formula $[Li(G4)_1][TFSA]-4HFE$.

As the ether of the aprotic solvate ionic liquid, tetrahydrofuran (THF: manufactured by Wako Pure Chemical Industries, Ltd.), and monoglyme (G1: 1,2-dimethoxyethane), diglyme (G2: diethylene glycol dimethyl ether), triglyme (G3: triethylene glycol dimethyl ether) and tetraglyme (G4: tetraethylene glycol dimethyl ether) that are manufactured by Kishida Chemical Co., Ltd. can be used. THF, G1, G2, G3 and G4 include one ether oxygen [O] atom, two ether oxygen [O] atoms, three ether oxygen [O] atoms, four ether oxygen [O] atoms and five ether oxygen [O] atoms, in one molecule, respectively.

In a discharge reaction of the secondary battery using sulfur as the active material, a chemical species called lithium polysulfide ($Li_2S_N$: $Li_2S_8$, $Li_2S_4$, $Li_2S_2$) is intermediately generated in the course of the reduction of sulfur to $Li_2S$. The solvate ionic liquid has an extremely low solubility for lithium polysulfide, and therefore, can actualize a high cycling characteristic in the case of the use in the lithium/sulfur secondary battery.

As the hydrofluoroether with which the aprotic solvate ionic liquid is diluted, for example, any one of following solvents manufactured by Daikin Industries, Ltd. can be suitably used.

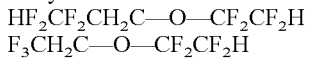

$F_3CH_2C$—O—$CF_2CF_2H$

The addition amount of the solvent is set, for example, such that an ionic conductivity (30° C.) is 0.1 mS/cm or higher and a viscosity (30° C.) is 10 mPa·s or lower.

In a glove box under the argon atmosphere, a moderate amount of the electrolyte 14 was added to the cathode 11, and the cathode 11 was immersed in the electrolyte at 60° C. for 60 minutes. The cathode 11 and the anode 12 were laminated with the separator 13, were impregnated with the electrolyte 14, and thereafter, were encapsulated in the coin cell case 20 (SUS304, thickness of 3.2 mm). Then, the spacer 21 was placed on the anode 12. The spring 22 was disposed on the spacer 21. The coin cell case 20 was sealed with the cap 23 on the spring 22.

The charge-discharge test was performed at 30° C. and a current density of 1/12 C (1 C=1166 mA/g-$Li_2S$). Only a first charge was performed at 4.4 V (vs. Li/$Li^+$) for activation, and subsequent charges and discharges were performed at 1.5 V to 3.5 V.

Figure 9:
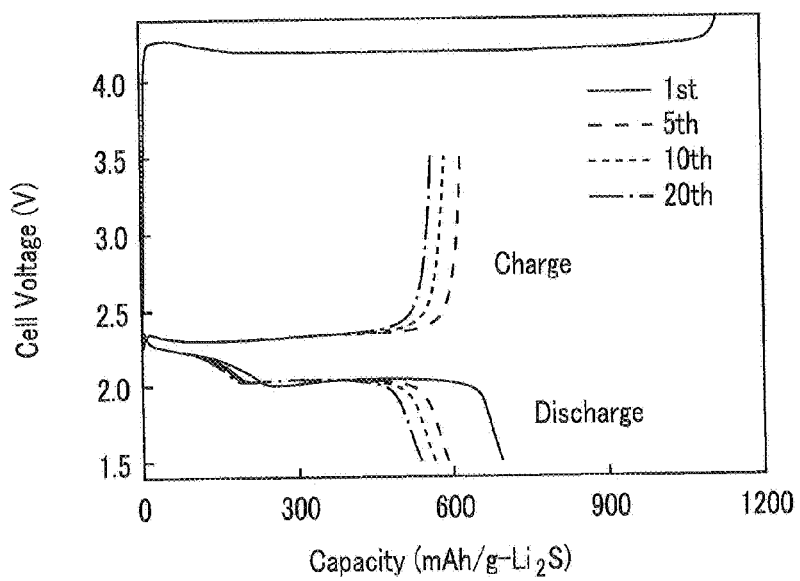
FIG. 9 is a graph showing a result of a charge-discharge test for the battery in the embodiment.
Figure 10:
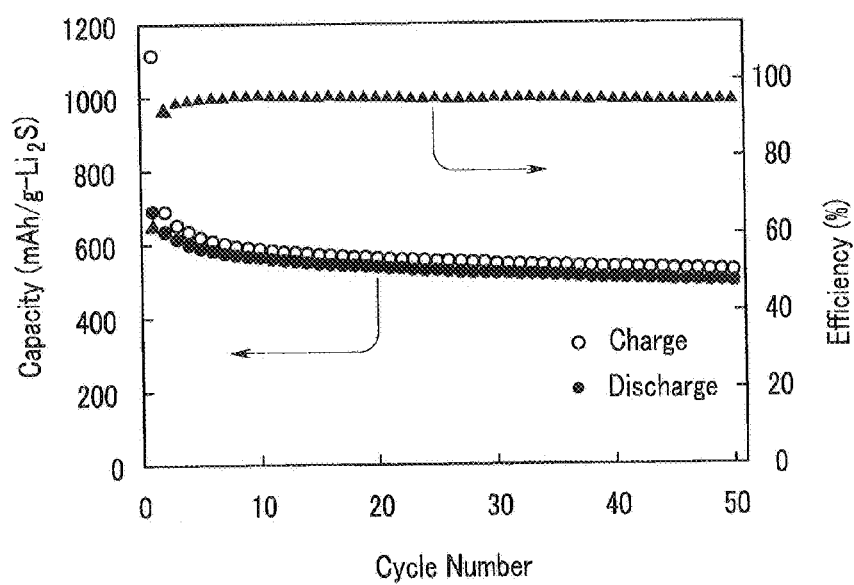
FIG. 10 is a graph showing a result of the charge-discharge test for the battery in the embodiment.

As shown in FIG. 9, in the first charge, an even portion appeared at 4.2 V in connection with the activation of $Li_2S$. As shown in FIG. 10, a charging capacity was 1116 mAh/g, and a value nearly equal to 1166 mAh/g, which the theoretical capacity of $Li_2S$, was obtained.

In the discharge, even portions appeared at 2.2 V and 2.0 V. The even portion at 2.2 V corresponds to the reduction reaction of sulfur ($S_6$) to ($Li_2S_N$: $4 \leq N \leq 8$). Further, the even portion at 2.0 V corresponds to the reduction reaction of ($Li_2S_N$: $4 \leq N \leq 8$) to $Li_2S_2$ and further $Li_2S$.

Note that an even portion near 2.3 V in second and subsequent charges corresponds to the oxidation reaction of $Li_2S$.

Further, as shown in FIG. 10, an initial discharging capacity was as high as 693 mAh/g, and even after 50 charge-discharge tests (50 cycles), the discharging capacity was 497 mAh/g. Further, an average coulombic efficiency in the 50 cycles was 95%.

The composition ratio of the (lithium sulfide/carbon) composite 44 is roughly determined by the mixture ratio between lithium sulfate monohydrate and the carbon particle at the time of the preparation of the first dispersed solution 30. The weight ratio (carbon particle weight/lithium sulfate monohydrate weight) of the carbon particle 40 to lithium sulfate monohydrate in the first dispersed solution 30 is 0.30 (0.48 g/1.60 g) in the above embodiment, and preferably should be 0.20 or more and less than 0.40. In the case of the lower limit or more, the carbon content of the (lithium sulfide/carbon) composite 44 is 10 wt % or more, and a high conductivity is obtained. Therefore, the charge-discharge characteristic is excellent. Further, in the case of less than the upper limit, the carbon content is 30 wt % or less, the content rate of lithium sulfide is high, and a high capacity is obtained.

Next, a battery having roughly the same configuration as the configuration of the battery 10, in which the content rate of the carbon component contained in the cathode active material (mixture) containing the (lithium sulfide/carbon) composite 44 was similarly 30 wt % but the mixture ratio between the carbon (carbon particle 40A) contained in the (lithium sulfide/carbon) composite 44 and carbon black was changed, was made, and the charge-discharge characteristic was evaluated.

When carbon black was 10 wt % or more and 15 wt % or less, that is, when the weight ratio of carbon black to the carbon particle 40A was 0.33 or more and 0.50 or less, a high characteristic that was roughly the same as the characteristic in the case of 13 wt % carbon black was confirmed. However, when carbon black was less than 10 wt % or more than 15 wt %, the even portion in the first charge rose to 4.4 V or higher and the activation of $Li_2S$ was not easy, in each case. Further, the charging capacity and the result of 50 charge-discharge tests also tended to decrease.

This shows that an optimum value of the mixture ratio between the carbon contained in the (lithium sulfide/carbon) composite 44 and carbon black exists because the carbon contained in the (lithium sulfide/carbon) composite 44 contributes to the current collection for lithium sulfide while carbon black improves the electron conductive property among the (lithium sulfide/carbon) composites 44.

Further, the alkali metal/sulfur secondary battery 10 in the embodiment configures a cell by distantly disposing the cathode 11 and the anode 12 with the separator 13 and making the separator contain the electrolyte 14, but may have a structure in which a plurality of cells laminated or a wound cell is contained in a case. The current collectors of the cathode and the anode are led out of the case and are electrically connected to tabs (terminals), respectively.

<Second Embodiment>

Next, a lithium sulfur battery 10A including an active material particle 44A as the cathode material, and the like will be described. The lithium sulfur battery 10A and the like in the present embodiment are similar to the lithium sulfur battery 10 and the like. Therefore, identical reference characters are assigned to identical component elements, and the description is omitted.

Figure 11:
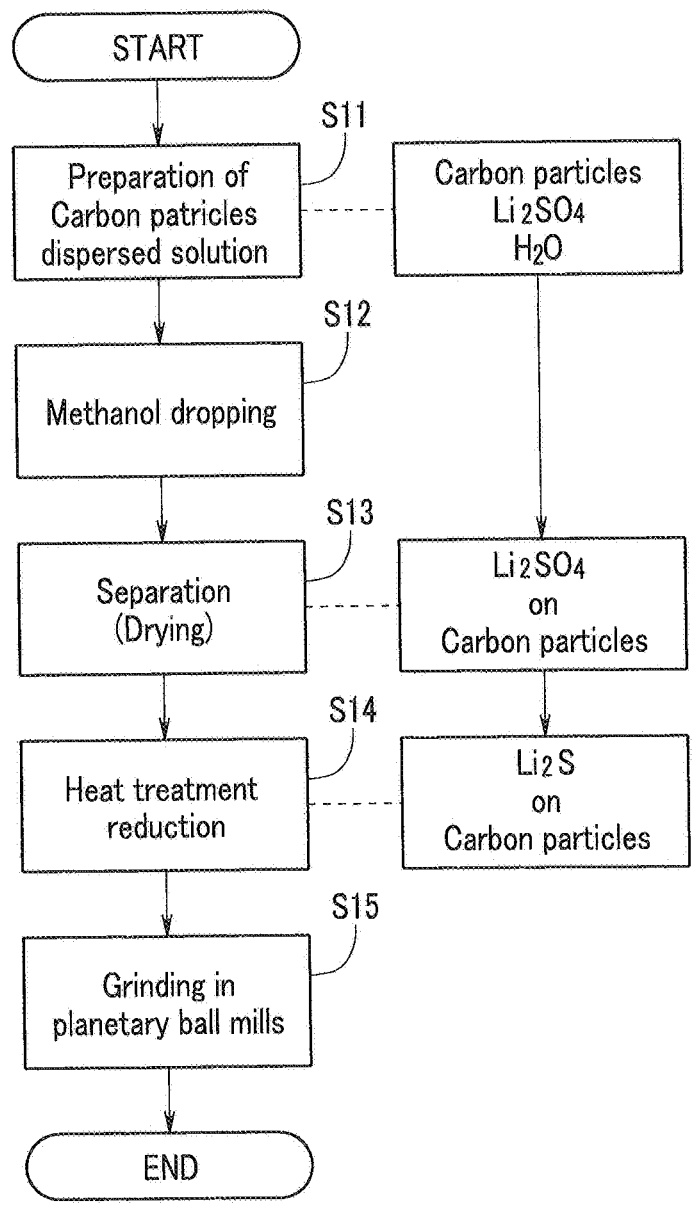
FIG. 11 is a flowchart of a production method for a cathode material of a battery in a second embodiment.

As shown in a flowchart of FIG. 11, in a production method for the cathode material of the battery 10A, a step (step S15) of decreasing the particle diameter of the active material particle 44 is further included, after the heat treatment of the precursor particle 41 as the active material particle 44 in step S14.

In step S15, the active material particle 44 becomes an active material particle 44A having a smaller particle diameter, by a planetary ball mill process that is a mechanical grinding process.

Figure 12:
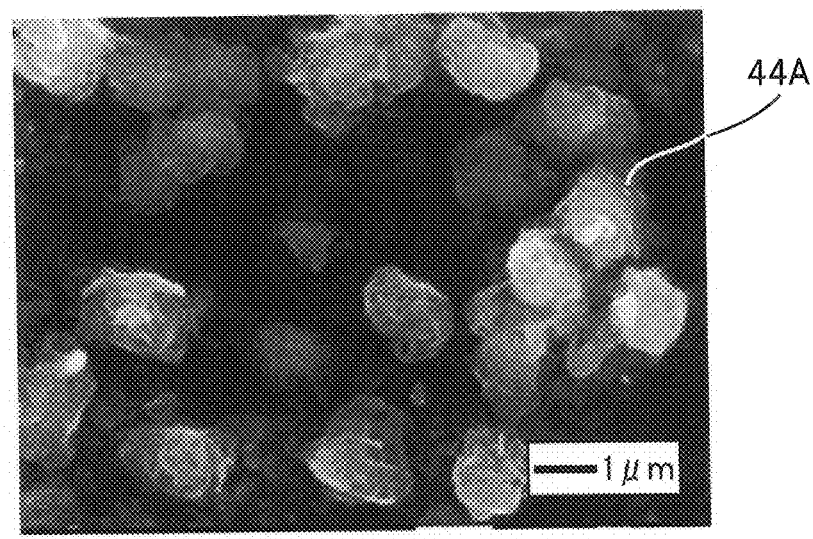
FIG. 12 is a SEM micrograph of an active material particle of the battery in the second embodiment.

For example, as shown in FIG. 7B and FIG. 12, the active material particle 44 having a particle diameter of 1.0 μm to 10.0 μm (average particle diameter d50=6.5 μm) was grinded into a (lithium sulfide/carbon) composite (active material particle) 44A having a particle diameter of 0.68 μm to 1.08 μm (average particle diameter d50=0.85 μm), by the planetary ball mill process. The grinding process was performed in a glove box under an argon atmosphere having a dew point of −95° C.

The battery 10A with the same method/configuration of the battery 10 in the first embodiment was made, using the active material particle 44A as the (lithium sulfide/carbon) composite.

Figure 13:
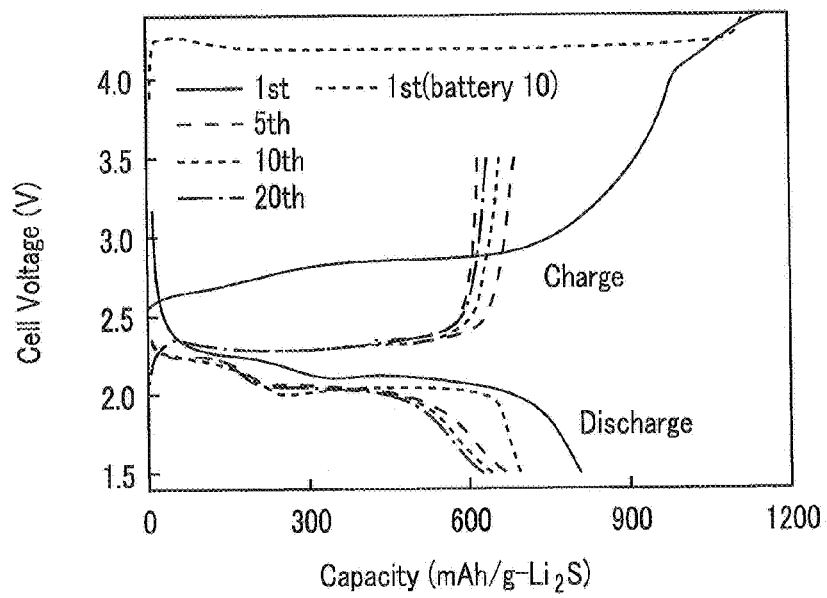
FIG. 13 is a graph showing a result of the charge-discharge test for the battery in the second embodiment.

As shown in FIG. 13, in the charge-discharge characteristic of the battery 10A, the overvoltage in the first charge step was greatly decreased from 4.2 V to 2.9 V, compared to the battery 10 including the (lithium sulfide/carbon) composite 44 having a larger particle diameter.

Figure 14:
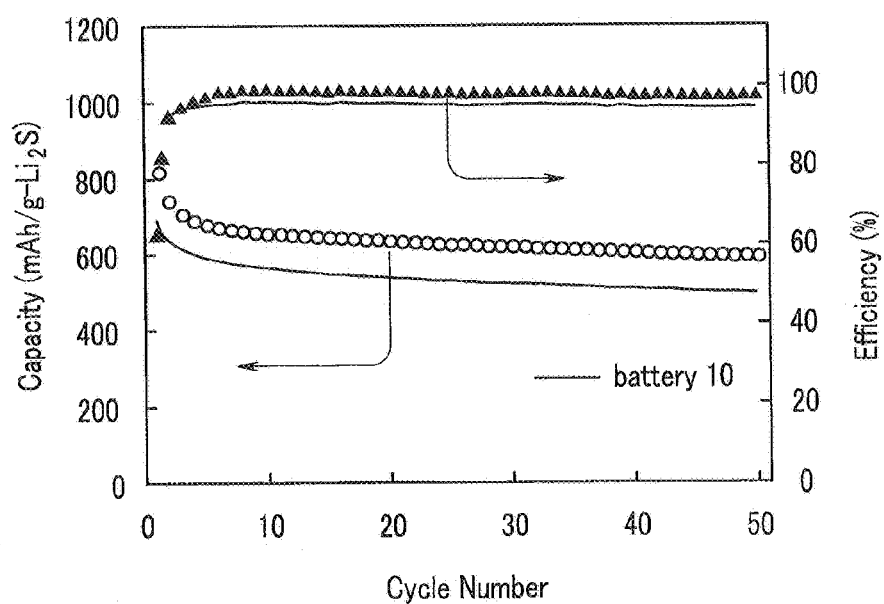
FIG. 14 is a graph showing a result of the charge-discharge test for the battery in the second embodiment.

Furthermore, as shown in FIG. 14, the initial discharging capacity of the battery 10A was 812 mAh/g, and was higher than the initial discharging capacity of the battery 10. Even after 50 charge-discharge tests (50 cycles), the discharging capacity was 588 mAh/g. Further, the average coulombic efficiency of the battery 10A in the 50 cycles was 97%, which was higher than the average coulombic efficiency of the battery 10.

The evaluation was performed while a process condition in step S15, more specifically, a process time period was changed. As a result, it was revealed that the reason why the battery 10A had better characteristics than the battery 10 was because the average particle diameter d50 of the active material particle 44A was 1 μm or less. Note that it was not easy to disperse the active material particle 44A at a high density in the preparation of the cathode material (mixture) by the mixing with carbon black or the like, when the average particle diameter d50 of the active material particle 44A was less than 0.1 μm.

Note that it is possible to decrease the particle diameter of the active material particle made in the heat treatment step (S14) also by performing a step of mechanically grinding the carbon particle 40 and decreasing the particle diameter before step S11 (dispersed solution preparation). However, the battery that was made by the method and that included an active material particle having a particle diameter of 1 μm or less had worse characteristics than the battery 10A.

Therefore, it is thought that the reason why the battery 10A had better characteristics than the battery 10 was not only because the surface area of the active material particles was increased but also because surfaces of the carbon particles 40A having a lower conductivity than lithium sulfide were exposed on outer surfaces by the mechanical grinding process.

The mechanical grinding process may be, for example, a tumbling ball mill, a vibratory ball mill or a jet mill if the process is a mechanical process. Further, as the ball for the ball mill, an alumina spherolith, a natural silica, an iron ball, a zirconia ball or the like is used. Further, for example, for decreasing the particle diameter to 1 μm or less, the rotation speed is 500 to 2000 rpm, and the process time period is 1 hour to 72 hours.

As described above, according to the production method further including the step of decreasing the particle diameter of the active material particle in the present embodiment, it is possible to produce a higher-performance lithium sulfur battery or the like because the particle diameter of the active material particle becomes 1 μm or less. Furthermore, it is more preferable that the above step is a mechanical grinding process that is performed after the step in which the active material particle is the precursor particle, because a part of the carbon particle is exposed on the outer surface of the active material particle.

<Third Embodiment>

Next, a lithium sulfur battery 10B including graphite as the anode material, and the like will be described. The lithium sulfur battery 10B and the like in the present embodiment are similar to the lithium sulfur battery 10 and the like. Therefore, identical reference characters are assigned to identical component elements, and the description is omitted.

Figure 15:
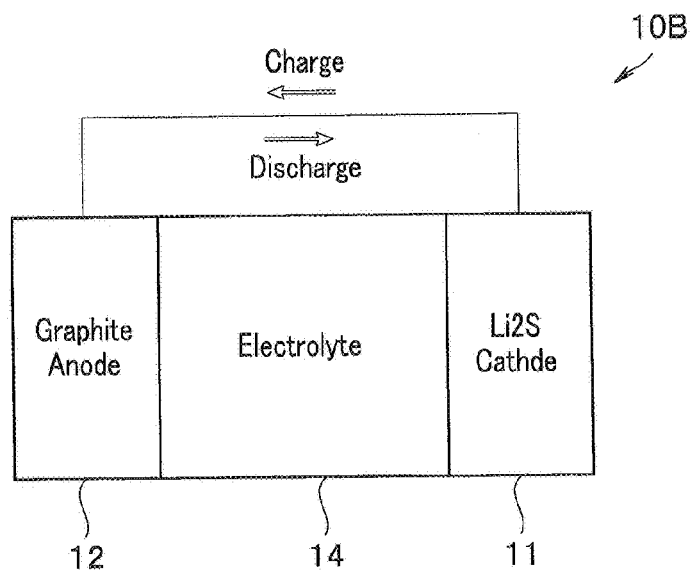
FIG. 15 is a configuration diagram showing a configuration of a battery in a third embodiment.

As shown in FIG. 15, the battery 10B includes graphite that is an elemental carbon in the anode 12 as the anode active material. The cathode 11 includes the active material particle 44A that is the (lithium sulfide/carbon) composite after the grinding process, and the electrolyte 14 is an aprotic solvate ionic liquid in which an ether and a lithium salt form a complex.

Graphite occludes and releases lithium ion. As shown in a following (Formula 4), carbon reversibly changes to lithium carbide, and therefore, can occlude (charge)/release (discharge) lithium ion.

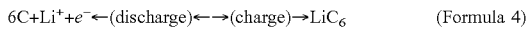
$$6C + Li^+ + e^- \leftarrow (\text{discharge}) \leftarrow \rightarrow (\text{charge}) \rightarrow LiC_6 \quad \text{(Formula 4)}$$

Figure 16:
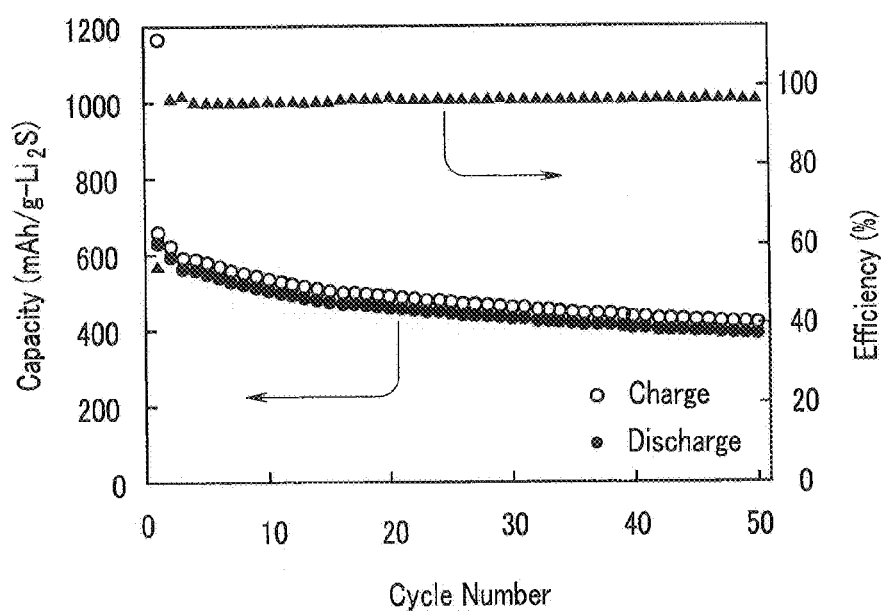
FIG. 16 is a graph showing a result of the charge-discharge test for the battery in the third embodiment.

As shown in FIG. 16, in the battery 10B, roughly the same characteristics as the characteristics of the batteries 10, 10A using a metal lithium as the anode active material were obtained.

For example, in the anode 12 of the battery 10B, it is preferable to use a mixture of a binding agent and the like, and an anode active material composed of a material containing at least one kind selected from carbon materials including crystalline elemental carbons such as natural graphite, synthetic graphite, carbon black, acetylene black, graphite, active carbon, carbon fiber, coke, soft carbon and hard carbon, and non-crystalline elemental carbons, and carbon group elements (elements belonging to Group 14) such as silicon and tin.

Note that, needless to say, also in the battery 10, similarly to the battery 10B, a carbon group element compound can be used as the anode active material. The battery 10B, in which the anode active material is not a metal lithium, has a higher safety than the batteries 10, 10A.

Note that products (cathode material/battery) produced by the production method in the present invention are under a circumstance in which it is not realistic at all to specify the products directly by the structures. As described already, in the active material particle in the present invention, the lithium sulfide 43 is formed on the outer surface of the carbon particle 40A. Here, the "formation" means that the lithium sulfate deposited on the outer surface of the carbon particle 40 is changed into the lithium sulfide by the reduction reaction, and for example, shows a different configuration from the configuration described in Japanese Patent Application Laid-Open Publication No. 2013-229227, in which a mere physical "fixation" is performed. The specifying of the lithium sulfide layer "deposited and formed" on the carbon particle requires, for example, the specifying of an atomic arrangement of an interface between the carbon particle and the lithium sulfide layer, and is not realistic.

The present invention is not limited to the respective embodiments and the like described above, and various modifications, combinations and applications can be made in a range without departing from the spirit of the invention.

The present application is filed based on the priority of Japanese Patent Application No. 2014-218504 filed on Oct. 27, 2014 in Japan, and the contents of the above disclosure are included in the description, the claims and the drawings in the present application.

DESCRIPTION OF SYMBOLS

10, 10A, 10B . . . lithium sulfur secondary battery
11 . . . cathode
11A . . . cathode active material layer
11B . . . current collector
12 . . . anode
12A . . . anode active material layer
12B . . . current collector
13 . . . separator
14 . . . electrolyte
20 . . . coin cell case
21 . . . spacer
22 . . . spring
23 . . . cap
24 . . . gasket
40, 40A . . . carbon particle
41 . . . (lithium sulfate/carbon) composite (precursor particle)
42 . . . lithium sulfate layer
43 . . . lithium sulfide layer
44, 44A . . . (lithium sulfide/carbon) composite (active material particle)

The invention claimed is:

1. A production method for a cathode material of a lithium sulfur battery, the production method comprising, in sequence:
   a step of preparing a first dispersed solution in which a carbon particle is dispersed in a lithium sulfate solution;
   a step of adding a solvent in the first dispersed solution, the solvent being a solvent in which lithium sulfate is insoluble;
   a step of separating a precursor particle from the first dispersed solution in which the solvent is added; and
   a step of changing the precursor particle into a cathode active material particle by heating the precursor particle under an inert atmosphere.

2. The production method for the cathode material of the lithium sulfur battery according to claim 1, wherein the lithium sulfate is deposited on an outer surface of the carbon particle while the carbon particle is nucleated, in the step of adding the solvent.

3. The production method for the cathode material of the lithium sulfur battery according to claim 2, wherein the lithium sulfate is reduced by carbon so as to become lithium sulfide, in the step of the heating.

4. The production method for the cathode material of the lithium sulfur battery according to claim 3, further comprising a step of decreasing a particle diameter of the cathode active material particle.

5. The production method for the cathode material of the lithium sulfur battery according to claim 4, wherein the step of decreasing the particle diameter of the cathode active material particle is a mechanical grinding process that is performed after the step of changing the precursor particle into the cathode active material particle.

* * * * *